United States Patent
Cai et al.

(10) Patent No.: US 7,356,327 B2
(45) Date of Patent: Apr. 8, 2008

(54) ENHANCED RECHARGE CARD MANAGEMENT SYSTEM WITH RESELLER USERS' SECURITY AND ACCESSIBILITY

(75) Inventors: Yigang Cai, Naperville, IL (US); John B. Reid, Naperville, IL (US); Jie Su, Shanghai (CN); Sunil Thadani, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 918 days.

(21) Appl. No.: 10/717,849

(22) Filed: Nov. 19, 2003

(65) Prior Publication Data
US 2005/0108126 A1 May 19, 2005

(51) Int. Cl.
*H04Q 7/20* (2006.01)
(52) U.S. Cl. ............... 455/406; 455/405; 379/114.15; 379/114.2
(58) Field of Classification Search ............. 455/405, 455/406, 407, 408, 409, 432.3, 422.1, 435.1, 455/432.1; 379/91.01, 114.15, 114.16, 114.17, 379/114.19, 114.2, 121.02, 121.03
See application file for complete search history.

(56) References Cited

U.S. PATENT DOCUMENTS

| 6,185,414 | B1* | 2/2001 | Brunner et al. ............. 455/406 |
| 6,575,361 | B1 | 6/2003 | Graves et al. |
| 2001/0000777 | A1* | 5/2001 | McGregor et al. .......... 455/406 |
| 2003/0008634 | A1 | 1/2003 | Laybourne et al. |
| 2003/0125968 | A1* | 7/2003 | Uppal .......................... 705/1 |

FOREIGN PATENT DOCUMENTS
WO   WO 2004/088644 A2   10/2004

* cited by examiner

*Primary Examiner*—Jean Gelin

(57) ABSTRACT

A method and apparatus for allowing a reseller to securely access and manage scratch cards at a recharge card management system that is maintained by the service provider. The service provider and reseller users of the recharge card management system can create a scratch card batch that is associated with the reseller account identification. The service provider and reseller users can search, view and modify scratch card data based on security and accessibility. Advantageously, the reseller or distributor can only manage and sell scratch card only to its own account identification, thus protecting such transactions against fraud.

18 Claims, 3 Drawing Sheets

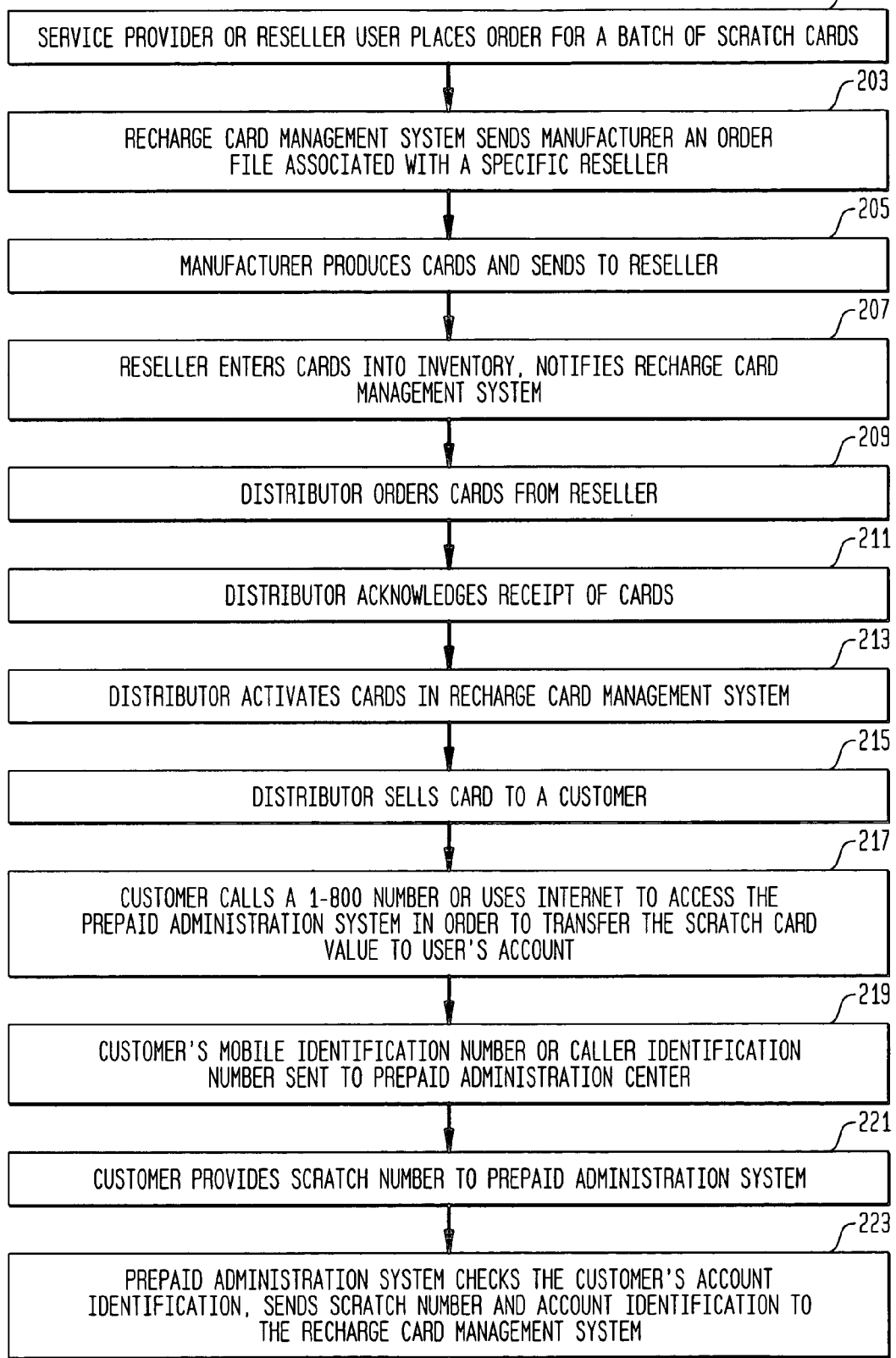

Figure 1:
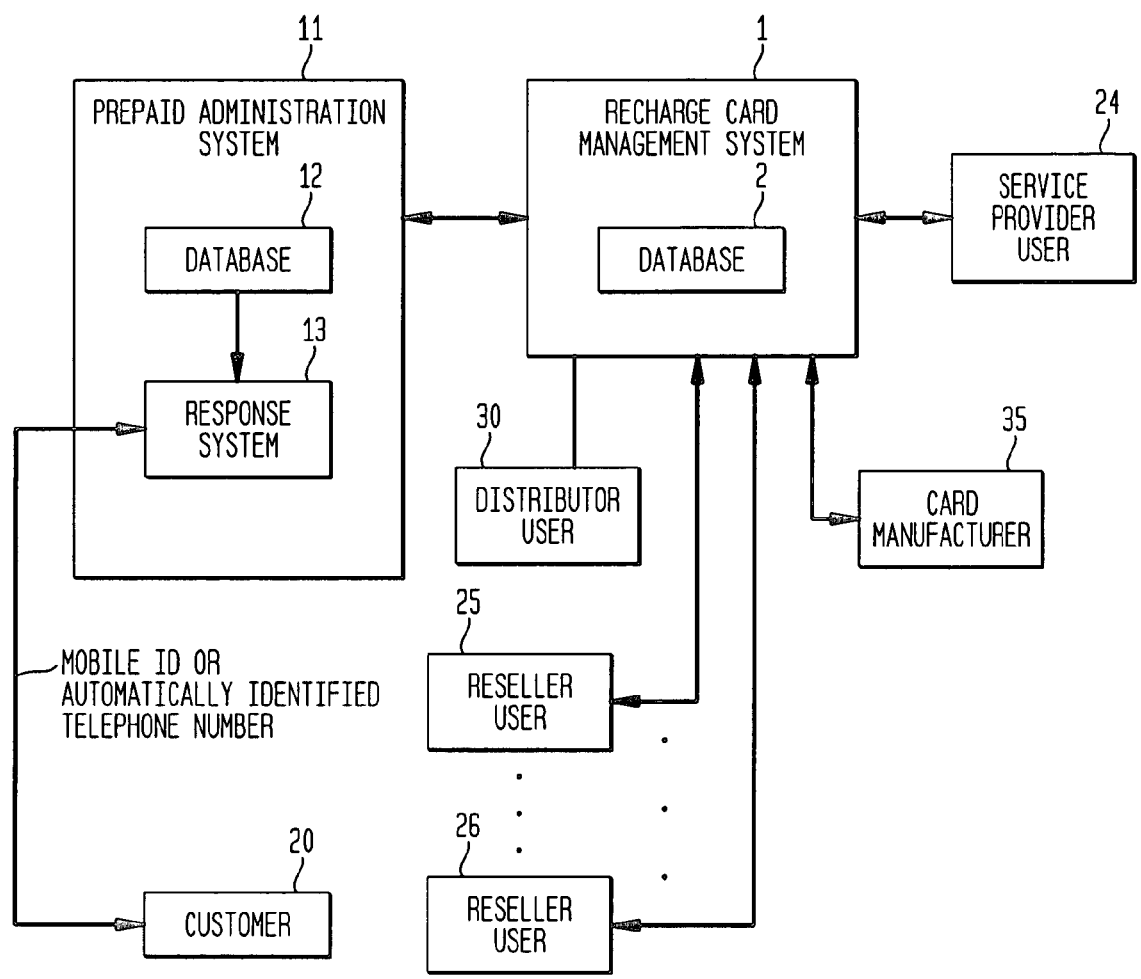

ENHANCED RECHARGE CARD MANAGEMENT SYSTEM WITH RESELLER USERS' SECURITY AND ACCESSIBILITY

TECHNICAL FIELD

This invention relates to a method and apparatus for a recharge card management system.

BACKGROUND OF THE INVENTION

Telecommunication customers are billed in one of two ways. Postpaid customers are billed by accumulating charges for a call in a billing system and subsequently using the accumulated charges to prepare a bill that is sent to the customer. Prepaid service is provided by allowing customers to build up a prepaid account and subtracting from this account the amount of any charges for each call.

In accordance with one prior art of prepaid charging method, customers can purchase recharge cards (scratch cards) which can be used by the customers to increment the amount stored for these customers in their accounts. Such cards can only be purchased from the service providers, and retailers and/or distributors which are associated with service providers. A customer who has purchased such a card can communicate with an interactive voice response (IVR) system to enter data on the card. A wireless customer is identified by the mobile identification number (MIN) or mobile directory number (MDN). A wireline customer is identified by automatic number identification of the calling line. The prepaid administration system uses the customer's identification, plus other data entered by the customer, to access and modify the data in the customer's account. There is a recharge card management system which stores the recharge card information, including card batch and serial number, card number (or PIN), card face value, and card status. The prepaid administration system will validate the recharge card information on the recharge card management system by providing customer identification, card number (or PIN). The recharge card management system validates the card status, if it is valid and activated, it will respond the prepaid administration system with card face value. The prepaid administration system then increments the customer's prepaid account.

A problem of the prior art is that the recharge card management system is accessible and manageable by the service providers only. Independent resellers and retailers can not access and manage the recharge cards, including creation of scratch cards, viewing and modifying card information and status—such independent resellers can advertise the prepaid cards and thus help to bring more business to the service providers. In addition, such resellers may have a large number of points of sale to make it more convenient for customers to purchase the scratch cards. A problem of the prior art is that there is no satisfactory arrangement for allowing independent resellers or retailers to access and manage the recharge card management system securely and to sell such scratch cards to customers.

SUMMARY OF THE INVENTION

The above problem is solved and an advance is made over the teachings of the prior art in accordance with this invention wherein the recharge card management system can be accessed and managed by both service providers and independent resellers; while the service providers can access and manage all of cards, the independent resellers can only access and manage cards belonging to the reseller. Both service provider users and independent reseller users of the recharge card management system can create a scratch card batch or a group of batches. The scratched card batch (and group of batches) created for a reseller is identified through the account identification of this specific reseller and stored in the database of the recharge card management system which can be accessed and modified only by the system users of this reseller with the same account identification or the service provider administration users. Any other reseller user (with different account identifications) will not be allowed to access the card information. If there is a hierarchy of resellers, each reseller can access data only for accounts of resellers below it in the hierarchy. Advantageously, with this arrangement data for individual resellers identifies the scratch cards that they are authorized to manage and sell; therefore only the reseller that is authorized to sell particular scratch cards can sell these cards and be billed by the service provider when such scratch cards are replenished.

In accordance with one preferred embodiment of Applicants' invention, even though the recharge card management system is maintained by the service providers, resellers and distributors are authorized to manage the recharge card through the recharge card management system. Access includes creating a scratch card batch or group of batches (each of them associated with the account identification of resellers themselves), search and view card information for cards having the same reseller account identification, changing card status (activated/deactivated, deleted/canceled, expired, used) for cards having the same reseller account identification. The service provider users of the recharge card system can create a scratch card batch or group of batches to be assigned to any reseller account identification as needed, and search and view the card information and modify the card status for the cards belong to all resellers and retailers. When a customer accesses the prepaid administration system used for updating prepaid accounts via the interactive voice response (IVR) or internet, the customer provides the scratch card information and account identification (MIN or MDN for mobile phone). Sometimes the IVR can automatically identify the MIN or MDN. The prepaid administration system searches the subscriber database and finds out the reseller or distributor account identification for this customer. When a mobile phone is issued by this reseller, the reseller account identification is stored in the database of the prepaid administration system. The prepaid administration system then queries the recharge card management system with the scratch card number inputted by the customer. The recharge card management system verifies that the scratch card is legitimate, identifies the reseller to whom this scratch card was sold, and verifies the face value of the scratch card through its database. If the card is valid (i.e., activated), the recharge card management system returns the face value of card along with the reseller account identification associated with this card back to the prepaid administration system. If the card is used, expired, canceled, or deactivated, the recharge card management system will return an error response. When the prepaid administration system receives the positive response with card face value and reseller account identification, it compares the account identification with that obtained from its own database. If the two match (i.e., the scratch card is issued by the same reseller of the mobile phone subscriber), the prepaid system returns data to the prepaid database to allow the account of the requesting mobile to be incremented by the face value of the scratch card and update the lifecycle of the customer prepaid account.

BRIEF DESCRIPTION OF THE DRAWING(S)

Figure 2B:
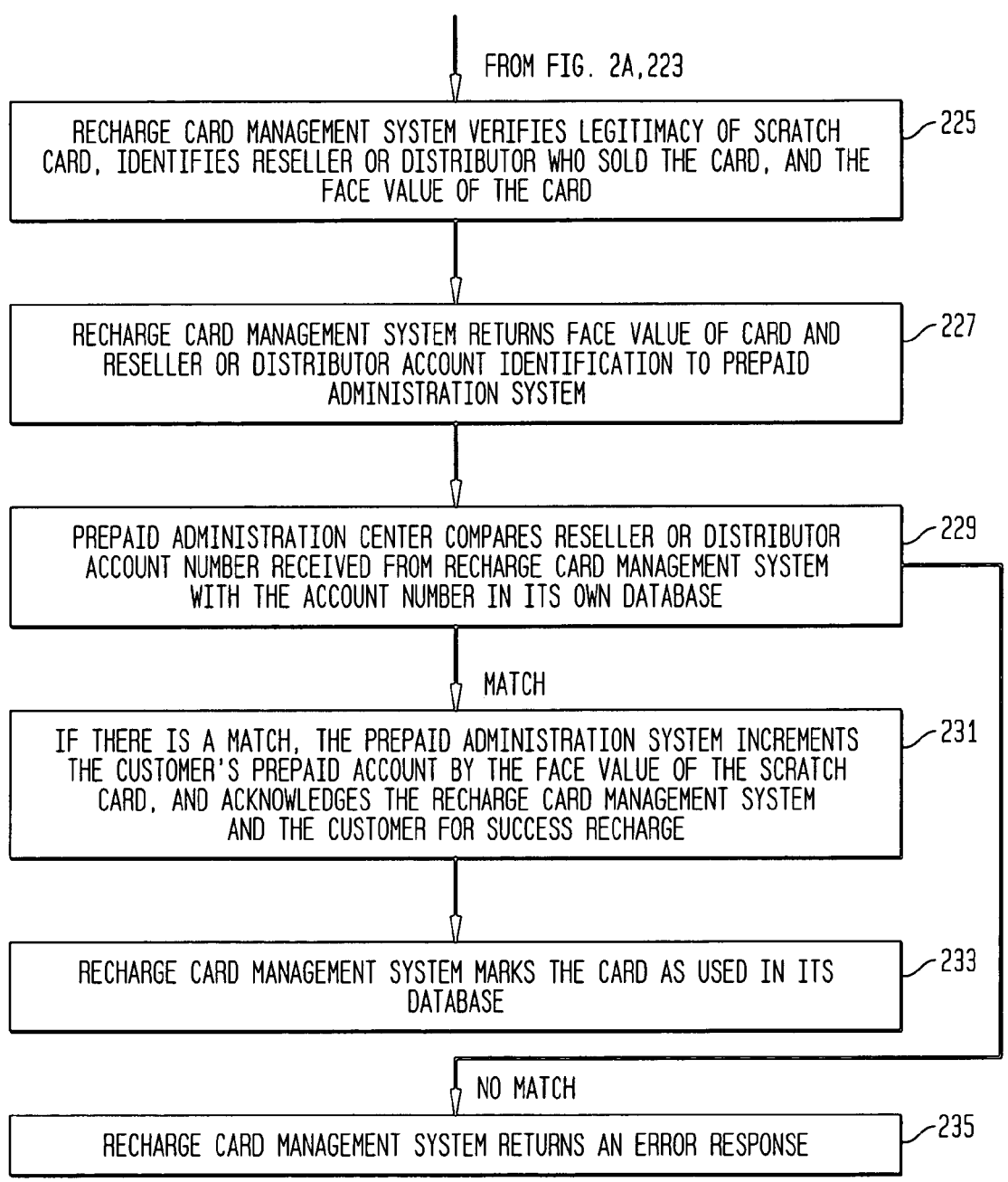

FIG. 1 is a block diagram illustrating the operation of Applicants' invention; and FIGS. 2a and 2b is a flow diagram illustrating the operation of Applicants' invention.

DETAILED DESCRIPTION

FIG. 1 is a block diagram illustrating the operation of Applicants' invention. A recharge card management system 1 maintained by the service provider is used to store data for verifying the validity of cards and the identity of the reseller (25, . . . ,26) authorized to manage and sell the cards. The recharge card management system 1 possesses the following functionalities: create card manufacturing order file, inventory the card returned from the manufactures, distribute the cards to distributor, verify the card status for prepaid administration system.

The recharge card management system 1 that stores all recharge card information is accessible by the service provider administration users 24, reseller users and distributor users 25, . . . ,26. All cards are identified with reseller account identifications. These users can create new card batches, search and view card information and modify the card status. Each reseller has a plurality of distributors such as distributor 30 which deal with customers such as customer 20. Each reseller can only access entries in the card database for cards associated with its own account identification.

The recharge card management system 1 maintains the user profile that contains information of service provider users, reseller users and distributor users. Users have user id, password for providing reseller account identifications, permissions of access security levels and operation levels, etc. The service provider users as administrative users may access and manage all of recharge cards. Reseller users only access and manage the cards belong to the reseller with the reseller identification associated with this user in the user profile. The user profile is stored in the database of the recharge card management system, and maintained by the service provider, i.e., only administrative users can create, access and modify the profile.

Resellers and distributors can be arranged in a hierarchy, wherein a reseller can control a plurality of first level distributors, each of which can control a plurality of second level distributors, etc. A user of a first level distributor can only access its own card database and that of second level distributors controlled by that first level distributor; the reseller can access card databases of all first, second, . . . , etc. level distributors which it owns or controls, directly or indirectly. The account identification of the distributor that sells the card allows this access to be enforceable.

During the creation of card manufacturing order file, the system users access the system remotely via user browser, and use a GUI (Graphical User Interface) screen to create the manufacturing order file. The manufacturing order file includes, but is not limited to, contract number, manufacturer name, reseller name and account identification, batch number, serial number (for example, 1 to 10,000), and the random card number (scratch number, sometimes called a Personal Identification Number (PIN)) that is associated with each of the cards, creation date and other information. One manufacturing order file can include one scratch card batch, or multiple batches with the same or different reseller identification, or a group of batches with a group number. One group may contain one or multiple batches with the same or different reseller identification. All of the manufacturing order files created within the system are stored in the database for searching and viewing late by the system users.

The manufacturing order file after creation is securely encrypted and sent to the manufacturer. A card manufacturer 35 manufactures a batch of cards, and returns them to the associated reseller(s).

The reseller then books the card into the recharge card management system via the GUI interface, to create a card inventory. The reseller updates the manufacturing order in the inventory, accepts or rejects cards either individually or in batches. The inventory function also allows the reseller to track the location of the scratch card batches and dispose of the scratch cards as returned, cancelled or expired. The recharge card management system maintains all inventory data in the database. The inventory data is searched and viewed by the system users via GUI screen.

The inventoried cards are distributed to distributors for sale. The distribution process is completed by the recharge card management system. All distribution information is stored in that database 2. A distribution order can be from one distributor to another sub-distributor creating a hierarchical distribution system. The distribution hierarchy can be defined as a multiple levels. When the reseller or distributor sells a card, they update the database of the data associated with the card via GUI screen when accessing the card management system 1.

Subsequently, the customer 20 who has purchased this card accesses the prepaid administration system 11. The customer dials an 800 number and is connected to a response system 13 of the prepaid administration system 11. In response to requests from the response system, the customer provides the scratch number using the customer's dualtone multifrequency (DTMF) keypad. The prepaid administration system 11 searches the subscriber database and finds out the reseller account identification associated with this customer. A mobile phone is issued by this reseller and the reseller account identification has been stored in the database of the prepaid administration system 11. The prepaid administration system then queries the recharge card management system with the scratch card number inputted by the customer. The recharge card management system verifies that the scratch card is legitimate, identifies the reseller to whom this scratch card was sold, and verifies the face value of the scratch card through its database. If the card is valid (i.e., activated), the recharge card management system returns the face value of card along with the reseller account identification associated with this card back to the prepaid administration system. If the card is used, canceled, expired or deactivated, the recharge card management system will return error response. When the prepaid administration system receives a positive response with the card face value and reseller account identification, it compares the account identification with that obtained from its own database. If the two match (i.e., the scratch card is issued by the same reseller of the mobile phone subscriber), the prepaid system allows the account of the requesting mobile subscriber to be incremented by the face value of the scratch card and the lifecycle of the customer prepaid account updated.

For a system such as the one described herein to work, it is essential that security be maintained. The first step in the security system is that the manufacturer maintains strict control of manufactured cards. The messages sent by service providers or resellers accessing the recharge card management system to create a scratch card manufacturing order file which contains manufacturer name, reseller name and account identification, card number, batch number, serial number, creation data (or timestamp) and other information, should be securely encrypted before being transmitted to the manufacturer. The manufacturer will decrypt the manufacturing order file with the same security key after receiving it.

The next step is distribution to the resellers and thence the distributors. Each reseller or distributor can access data in the recharge card management system only for cards in its own hierarchy; data access includes the ability to search and view card information and status, change card status (activated/deactivated, used, expired, suspended, canceled, deleted).

FIG. 2 is a flow diagram illustrating the operation of Applicants' invention. A service provider user 24 or reseller user 25, . . . ,26 accesses the recharge card management system 1 and uses the system to create a new scratch card manufacturing order file (action block 201). The manufacturing order file includes contract number, manufacturer name, reseller name and account identification, batch number, serial number (for example, 1 to 10,000), and the random card number (scratch number, sometimes called a Personal Identification number (PIN)) that is associated with each of the cards, creation date (or timestamp) and other information. The manufacturing order file is securely encrypted and sent to the manufacturer 35 (action block 203). The manufacturer produces the cards and sends them to the reseller and/or distributor (action block 205). Each card has a hidden scratch number and a visible batch and serial number.

The reseller 25, . . . ,26 enters the cards into its inventory and notifies the Recharge Card Management System 1 (action block 207). Each distributor 30 then orders cards from the reseller 25, . . . ,26 (action block 209). The distributor acknowledges receipt of the cards (action block 211) and activates the card in the recharge card management system 1 (action block 213). The distributor 30 sells the card to a customer 20 (action block 215). The customer calls an 800 number or uses the Internet to access the prepaid administration system 11 (action block 217) to transfer the scratch card face value to his/her prepaid account. In order to do so, the customer supplies its mobile identification number for mobile telephones, or automatically identified telephone number for landlines (action block 219). The customer supplies the scratch card number, obtained by scratching off the coating covering the scratch number (action block 221). The prepaid administration system 11 checks the account identification of the customer from its database when using his/her mobile identification as key, then sends both the scratch card number to the recharge card management system 1 for validation (action block 223). The recharge card management system 1 verifies that the scratch card is legitimate, identifies the reseller to whom this scratch card was sold, and verifies the face value of the scratch card through its database 2 (action block 225). If the card is legitimate (i.e., activated), the recharge card management system 1 returns the face value of card along with the reseller account identification associated with this card back to the prepaid administration system 11 (action block 227). If the card is used, expired or deactivated, the recharge card management system will return error response (action block 235). When the prepaid administration system receives a positive response with the card face value and reseller account identification, it compares the account identification with that obtained from its own database (action block 229). If the two match (i.e., the scratch card is issued by the same reseller of the mobile phone subscriber), the prepaid administration system 11 increments the customer prepaid account by the face value of the scratch card, update the customer prepaid account lifecycle, and acknowledge both of the recharge card management system and the customer 20 for success recharge (action block 231).

If a customer served by Reseller A were to use a scratch card issued by reseller B to replenish his/her account, the customer calls the prepaid administration system 11 and provides the scratch card number. The prepaid administration system 11 obtains his account identification (equal to reseller A's account identification) from his/her prepaid database, and sends the card number to the Recharge Card Management System 1 for validation. The recharge card management system 1 finds the card number is valid but it is associated with another account identification belong to reseller B; the recharge card management system 1 returns the card face value and account identification of reseller B to the prepaid administration system. The prepaid administration system compared the received reseller account identification (reseller B) with the account identification obtained from its own database (reseller A), and finds two are not match. The prepaid administration system notices the customer indicating the replenishment is not allowed because a wrong card was used, and also sends error message to the recharge card management system indicating the recharge failed.

After validating the scratch card and sending a positive response to and receiving acknowledgement from the prepaid administration system 11, the recharge card management system 1 will mark the card as used in its database 2 (action block 233).

The customer activates the account in the Prepaid Management System by supplying data (scratch card number, telephone or mobile telephone number (automatically supplied) that the customer may not want the reseller to know. The customer identifies the scratch card number by removing the protective covering on the card; the reseller's agent does not know the scratch card number; if the reseller's agent knew the scratch number, he/she could steal the prepayment and have it entered into his/her prepayment account The above description is of one preferred embodiment of Applicants' invention. Other embodiments will be apparent to those of ordinary skill in the art without departing from the scope of Applicants' invention. The invention is limited only by the attached claims.

We claim:

1. A method of incrementing a telecommunication customer's prepaid account with a prepaid administration system of a service provider comprising the steps of:
   creating data for a scratch card batch at a recharge card management system of a service provider by service provider users;
   said data comprising scratch numbers of said batch and reseller account identification data for identifying a reseller that manages and sells the batch;
   manufacturing said batch by either said service provider or said reseller;
   if said batch is manufactured by said reseller, providing said reseller with access to data for said batch;
   selling a card of said batch; and
   activating data for said card in said recharge card management system;
   said management system maintained by a service provider;
   said management system accessible only by authorized service provider or reseller users;
   said management system for storing users' profile data in its database;

said reseller users limited to accessing card information with their account identification information;

said reseller card identification information for identifying a reseller and distributors below said reseller in said reseller's hierarchy;

said customer calling a prepaid administration system to transfer the value of the scratch card to the customer's account;

if said scratch card is valid in said recharge card management system, responsive to the customer call, transferring a value of said card to said customer's account;

responsive to said transferring a value, invalidating said card in said recharge card management system; and billing said reseller for an amount associated with the value of said card.

2. The method of claim 1 further comprising the step of:
said prepaid administration system checking data received from said customer against data in a database of said recharge card management system to verify an authorization for incrementing said customer's prepaid account.

3. The method of claim 1 wherein the step of calling the prepaid administration system comprises the step of:
identifying the customer through a mobile identification number or a calling line identification number and the scratch number of said card.

4. The method of claim 1 wherein said users' profile contains data identifying a user name, a user password, a user account identification, and a user identification.

5. The method of claim 1 wherein a reseller can have multiple account identifications for distributors in a reseller's hierarchy.

6. The method of claim 1 wherein a user can input scratch card manufacturing data for the file at the recharge card management system.

7. The method of claim 1 wherein said manufacturing order file includes scratch card information, manufacturer name, reseller name, account identification and scratch number.

8. The method of claim 1 wherein a reseller user enters data for said scratch card in the card database of the recharge card management system, said data comprising an account identification of said reseller.

9. The method of claim 8 wherein said account identification of said reseller or an account identification of a distributor user is arranged in a hierarchy so that distributors can access data only for themselves or distributors further down in a hierarchy of distributors and a reseller user can access data for all distributors below the reseller in said hierarchy.

10. The method of claim 1 wherein a reseller or distributor user can modify the card status during inventory and distribution.

11. The method of claim 1 wherein the data in the card database identifies the reseller and includes the account number of the reseller.

12. The method of claim 1 further comprising the steps of:
a reseller selling a card to a distributor; and
activating said card with an account number of the distributor.

13. The method of claim 1 further comprising the step of:
marking the card as used after the customer's account has been incremented.

14. Apparatus for controlling incrementing of a telecommunication customer's prepaid account with a prepaid administration system of a service provider comprising:
a recharge card management system for creating data for a scratch card batch by service provider users;
means for manufacturing said batch by either said service provider or said reseller;
if said batch is manufactured by said reseller, means for providing said reseller with access to data for said batch;
means for selling a card of said batch; and
means for activating data for said card in said recharge card management system;
means for storing data for said batch, said data comprising scratch numbers and reseller account identification data for identifying a reseller that manages and sells the batch;
said management system maintained by a service provider;
said management system accessible only by authorized service provider or reseller users;
said management system further for storing users' profile data in its database;
said reseller users limited to accessing card information with their account identification;
said reseller card identification information for identifying a reseller and distributors below said reseller in said reseller's hierarchy;
responsive to selling said card to a customer, said card management system for activating said data for said card in said database;
if said scratch card is valid in said recharge card management system, means, responsive to a customer call, for transferring a value of said card to said customer's account;
means, responsive to said transferring a value, for invalidating said card in said recharge card management system; and
means for billing said reseller for an amount associated with the value of said card.

15. The apparatus of claim 14 wherein said prepaid administration system checks data received from said customer against data in a database of said recharge card management system to verify an authorization for incrementing said customer's prepaid account.

16. The apparatus of claim 14 wherein said recharge card management system is responsive to input from a user for creating manufacturing data for a database of said recharge card management system.

17. The apparatus of claim 14 wherein a reseller user inputs data for said scratch card in a database of the recharge card management system, said data comprising an account identification of said reseller.

18. The apparatus of claim 14 wherein said account identification of said reseller or an account identification of a distributor user is arranged in a hierarchy so that distributors can access data only for themselves or distributors further down in a hierarchy of distributors and a reseller user can access data for all distributors below the reseller in said hierarchy.

* * * * *